March 18, 1969     V. A. BOMBACI     3,432,960
RODS AND TUBULAR CONNECTORS HAVING MEANS
FOR LIMITING ROD INSERTION
Filed July 2, 1965
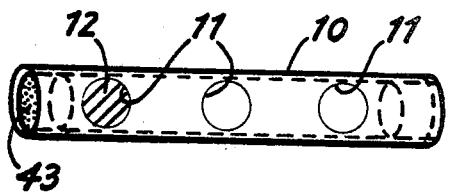
FIG.1
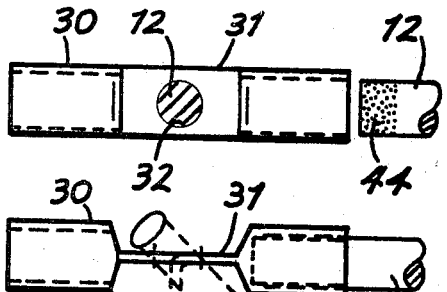
FIG.5
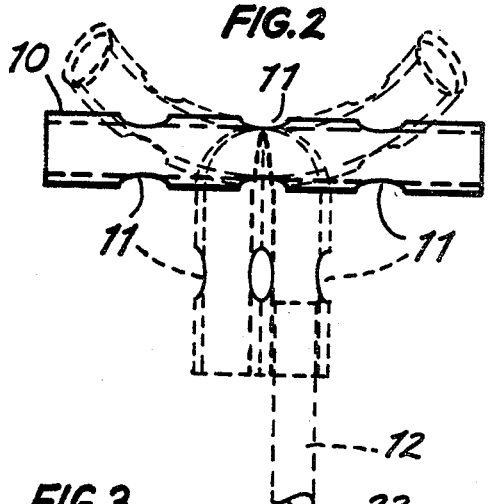
FIG.2
FIG.3
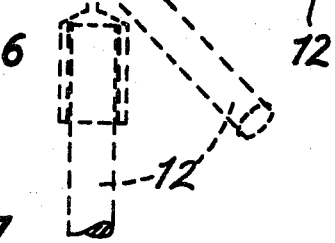
FIG.6
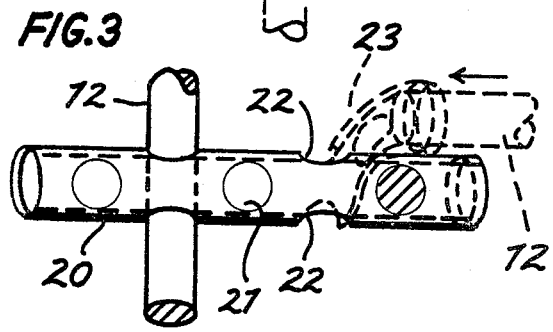
FIG.7
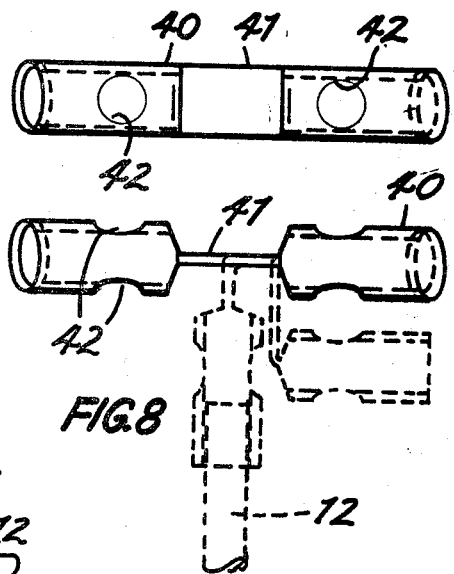
FIG.8
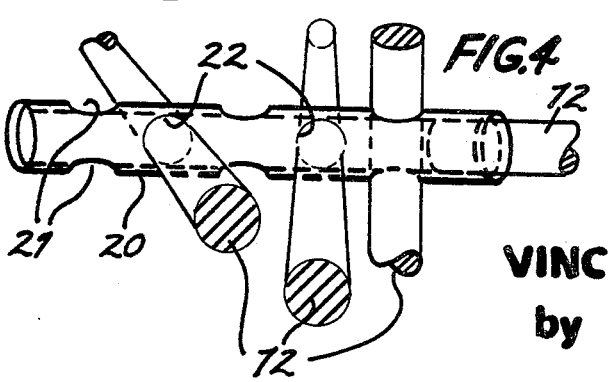
FIG.4
INVENTOR
VINCENT A. BOMBACI
by *Abbott Spear*,
ATTORNEY

United States Patent Office 3,432,960
Patented Mar. 18, 1969

3,432,960
RODS AND TUBULAR CONNECTORS HAVING MEANS FOR LIMITING ROD INSERTION
Vincent A. Bombaci, 31 Yarmouth Road, Norwood, Mass. 02062
Filed July 2, 1965, Ser. No. 469,110
U.S. Cl. 46—29
Int. Cl. A63h 33/12
5 Claims

ABSTRACT OF THE DISCLOSURE

Construction kit containing a plurality of rods of the same diameter and multipurpose connectors, each connector having a pair of holes transversely intersecting a passage in a tubular connector end, the connector end resisting axial distortion until a rod end is inserted a predetermined distance in that end with the pair of holes weakening the connector so that such distortion occurs if that distance is exceeded and before the inserted end blocks the holes.

---

The present invention relates to structural members and connectors therefor adapted for a wide range of creative uses.

Structural members and connectors in accordance with the invention are herein discussed primarily in connection with construction kits for children. Such kits are important because of the skills that children develop in playing with them and because they provide a stimulus to creative talents. Drawbacks to presently available construction kits are that the age groups to which they appeal are relatively limited and that the limitations they impose on sizes and shapes are too restrictive for creative work even though permitting assembly skills to be acquired.

The objective of the present invention is to provide structural members and connectors of simple, low-cost construction that may be assembled easily and securely in arrangements providing for sizes and shapes that are limited only to the creative talent of the child.

In accordance with the invention, this general objective is attained by providing kits consisting of a plurality of rods of the same diameter and usually of different lengths and a plurality of multipurpose connectors for joining the rods. Each connector is in the form of an elongated body of flexible stock having a passage extending from end-to-end thereof and provided with at least two holes in its wall within its length. The diameter of the holes and the diameter of the passage are so dimensioned relative to the ends of the rods as to ensure a tight connection when a rod is inserted a short distance into an end of said connector or through the holes in its wall. The holes provide a wall weakening means by creating an area where the lengthwise resistance of the connector against distortion is so reduced as to collapse and deflect in that area if the received end of a rod is urged inwardly substantially beyond that distance. It is preferred that the stock be plastic and that the connectors be tubular.

In the accompanying drawings, there are shown illustrative embodiments of the invention from which these and other of its objectives, novel features, and advantages will be readily apparent.

In the drawings:

FIGURE 1 is a side elevation of a connector with a structural member transversely secured thereto, FIGURE 2 is a view of the same type of connector illustrating positions it may assume in use, FIGURE 3 is a side elevation of a connector in accordance with another embodiment of the invention with a structural member being inserted in one end thereof, FIGURE 4 is another view of the connector shown in FIGURE 3 with another structural member secured transversely thereto, FIGURE 5 is a side elevation of a connector illustrating yet another embodiment of the invention, FIGURE 6 is a view of the connector shown in FIGURE 5 turned 90° from its FIGURE 5 position and illustrating different positions it may assume in use, FIGURE 7 is a side elevation of another embodiment of the invention of the same general type as shown in FIGURES 5 and 6, and FIGURE 8 is another view thereof of the connector with the connector turned 90° from its FIGURE 7 position and with several positions of use being indicated.

In the embodiment of the invention illustrated by FIGURES 1 and 2, there is shown a tubular connector 10 of a plastic stock that is both flexible and elastic and provided with a series of pairs of holes 11, the holes of each pair being shown as transversely alined.

The inside diameter of the connector 10 and the diameter of the holes 11 is slightly less than the ends of the structural members 12 which are shown as rod-like. The members are all of the same diameter and usually they are provided in different lengths, and each length may be of a particular color. They may be, however, of the same length and cut to fit by the user. For example, wooden dowels in the order of one-eighth inch in diameter may be easily cut with scissors. In addition, such dowels, while of adequate strength, may be flexed to a substantial extent where arcuate shapes are wanted.

In practice, the rods 12 are joined together by the connectors 10. It will be appreciated that the holes 11 not only make it easier to flex the connector 10 and provide annular, well defined fold zones but also they weaken the connectors axially. In accordance with the invention, the inside diameter of the connector, the dimensions of its wall, and the location of the holes therein relative to the ends of the connector are such that rods of a particular diameter may be readily inserted into the connector ends a distance short of the proximate holes 11 and on such short insertion become firmly secured. Distortion occurs in one or more of the annular zones if the received end of a rod is urged inwardly substantially beyond that distance, see FIGURE 3. While a rod may be forced entirely through a connector, the invention ensures that the ends of the rods are seated with substantial uniformity and that they do not accidentally intersect a hole 11 thereby to block the entrance of a rod into it.

In the construction of a model, a connector 10 may be used in straight form but one of the advantages of the invention is that each may be bent to the extent desired, even doubled upon itself as is illustrated by FIGURE 2. The rods 12 may be inserted through the holes 11 before or after a connector has been bent and it is not necessary that they be passed through transversely alined holes. In fact, a rod may be passed through two holes on the same side of the connector.

The embodiment of the invention illustrated by FIGURES 3 and 4 is generally similar except that the tubular member 20 has, in addition to the series of transversely alined pairs of holes 21, a second series of transversely alined pairs of holes 22, the pairs of holes 22 being shown as disposed at right angles to the pairs of holes 21. The member 20 may be cut, even with scissors, into shorter lengths, if desired. In FIGURE 3, a rod 12 is shown as seated in one end of the connector 20 and the collapse of the connector 20 in the zone of the proximate one of the transversely alined pair of holes 22 is indicated in dotted lines as at 23 as would occur if endwise pressure were exerted on that rod in the direction of the arrow in excess of that required to seat it.

As is illustrated by FIGURE 4, the advantages in using tubular stock for the connectors that is both flexible and elastic include that a connector, the connector 20, for example, yields readily if it is desired that a transversely supported rod 12 be forced into a position other than is normally established by the holes through which it is inserted.

In the embodiment of the invention illustrated by FIGURES 5 and 6, the connector 30 has an intermediate, heat-sealed flattened portion 31 shown as having a rod-receiving hole 32. While the connector 30 is centrally weakened in the zone of the hole 32, it also folds readily adjacent each extremity of the flattened portion 31 as will be apparent from FIGURE 6. The heat-sealed portions 31 enable two or more connectors 30 to be joined compactly together through their holes 32.

The embodiment of the invention illustrated by FIGURES 7 and 8 closely follows that detailed in connection with FIGURES 5 and 6 and comprises a connector 40 having a flattened, heat-sealed portion 41 between which and each end of the connector 40 there is a pair of transversely alined holes 42. The intermediate heat-sealed portion 41 is bendable as illustrated by FIGURE 8 and its junction with the end portions establish transverse zones wherein the connector 40 may be readily folded.

While it is usual for a child to wish to dismantle a model, in some instances it may be desired to permanently join the structural members and this may be accomplished by providing the ends of the passage of the connectors with an adhesive coat 43, see FIGURE 1, or by providing the ends of the rods 12 with an adhesive coat 44, see FIGURE 5.

From the foregoing, it will be apparent that construction kits in accordance with the invention are well adapted to meet a wide range of requirements because of their low cost and the adaptability of the connectors to meet structural requirements.

I claim:

1. A construction kit comprising a plurality of rods of the same diameter and a multipurpose connector for joining said rods, said connector comprising an elongated body of flexible stock, the body being tubular at least at one end and provided with at least one pair of holes forming a passage intersecting the last mentioned passage in said tubular end, the diameter of said passage and the diameter of said holes being dimensioned relative to the ends of said rods to ensure a tight connection when a rod is inserted through said holes or a short distance into said tubular ends, the lengthwise resistance of said tubular end being such as to withstand such short distance insertion therein without lengthwise distortion, the resistance to the insertion or removal of a rod increasing with the inserted rod length, said holes providing wall-weakening means by creating an area where the lengthwise resistance of said tubular end against distortion is weakened, said wall-weakening means being located to cause said resistance to collapse and deflect said tubular wall before the end of a rod inserted in said tubular end blocks said passage formed by said holes and after said short distance is exceeded.

2. The construction kit of claim 1 in which the connector is tubular at both ends.

3. The construction kit of claim 1 in which the connector is tubular throughout its length.

4. The construction kit of claim 1 in which the stock from which the body is formed is also elastic.

5. The construction kit of claim 1 in which the holes of each pair are transversely aligned.

References Cited

UNITED STATES PATENTS

| 3,148,539 | 9/1964 | Cook | 46—29 X |
| 3,274,728 | 9/1966 | Koch | 46—29 |

FOREIGN PATENTS

| 832,726 | 7/1938 | France. |

F. BARRY SHAY, *Primary Examiner.*